(12) United States Patent
Oh et al.

(10) Patent No.: US 9,032,337 B2
(45) Date of Patent: May 12, 2015

(54) METHOD AND APPARATUS FOR UNLOCKING ELECTRONIC APPLIANCE

(75) Inventors: Mi A Oh, Seoul (KR); Woo Je Lee, Yakum (IL)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 12/646,109

(22) Filed: Dec. 23, 2009

(65) Prior Publication Data

US 2010/0162182 A1 Jun. 24, 2010

(30) Foreign Application Priority Data

Dec. 23, 2008 (KR) ........................ 10-2008-0132497

(51) Int. Cl.
*G06F 3/033* (2013.01)
*G06F 3/0488* (2013.01)
*H04M 1/67* (2006.01)
*G06F 3/01* (2006.01)

(52) U.S. Cl.
CPC ............ *G06F 3/04883* (2013.01); *G06F 3/017* (2013.01); *H04M 1/67* (2013.01); *H04M 2250/22* (2013.01)

(58) Field of Classification Search
CPC ...................................................... G06F 3/017
USPC ......................................................... 715/863
See application file for complete search history.

(56) References Cited

U.S. PATENT DOCUMENTS

| | | | | |
|---|---|---|---|---|
| 5,252,951 | A * | 10/1993 | Tannenbaum et al. | ........ 345/156 |
| 7,180,501 | B2 * | 2/2007 | Marvit et al. | ................. 345/156 |
| 7,301,529 | B2 * | 11/2007 | Marvit et al. | ................. 345/156 |
| 7,365,737 | B2 * | 4/2008 | Marvit et al. | ................. 345/156 |
| 7,480,870 | B2 * | 1/2009 | Anzures et al. | ............... 715/772 |
| 7,593,000 | B1 * | 9/2009 | Chin | .............................. 345/156 |
| 7,657,849 | B2 * | 2/2010 | Chaudhri et al. | ............. 715/863 |
| 7,949,995 | B2 * | 5/2011 | Sadlek | .......................... 717/109 |
| 8,593,487 | B2 * | 11/2013 | Sabanai et al. | ................ 345/642 |
| 2005/0212757 | A1 | 9/2005 | Marvit et al. | |
| 2005/0216867 | A1 * | 9/2005 | Marvit et al. | ................. 715/863 |
| 2007/0150826 | A1 * | 6/2007 | Anzures et al. | ............... 715/772 |
| 2007/0150842 | A1 * | 6/2007 | Chaudhri et al. | ............. 715/863 |

(Continued)

FOREIGN PATENT DOCUMENTS

| | | |
|---|---|---|
| CN | 1801975 | 7/2006 |
| KR | 1020060133427 | 12/2006 |

(Continued)

OTHER PUBLICATIONS

International Search Report of Jul. 20, 2010 in International Application No. PCT/KR2009/007636.

(Continued)

*Primary Examiner* — William Titcomb (74) *Attorney, Agent, or Firm* — H.C. Park & Associates, PLC (57) ABSTRACT

An unlocking method and apparatus for an electronic appliance are disclosed. The method and apparatus may enable a user to unlock the electronic appliance by identifying a gesture and to invoke a function mapped to the gesture. The unlocking method includes detecting a preset gesture input when an input means is locked. The method includes unlocking the input means in response to the input gesture. The method also includes invoking an application mapped to the input gesture in response to unlocking.

27 Claims, 7 Drawing Sheets

(56) References Cited

U.S. PATENT DOCUMENTS

| | | | |
|---|---|---|---|
| 2008/0104526 A1* | 5/2008 | Jaeger | 715/763 |
| 2008/0278455 A1* | 11/2008 | Atkins et al. | 345/173 |
| 2009/0051648 A1* | 2/2009 | Shamaie et al. | 345/156 |
| 2009/0083850 A1* | 3/2009 | Fadell et al. | 726/19 |
| 2009/0231271 A1* | 9/2009 | Heubel et al. | 345/156 |
| 2009/0284482 A1* | 11/2009 | Chin | 345/173 |
| 2009/0327976 A1* | 12/2009 | Williamson et al. | 715/863 |
| 2010/0042954 A1* | 2/2010 | Rosenblatt et al. | 715/863 |
| 2010/0079380 A1* | 4/2010 | Nurmi | 345/172 |
| 2010/0116963 A1* | 5/2010 | Sabanai et al. | 248/454 |
| 2010/0306705 A1* | 12/2010 | Nilsson | 715/835 |
| 2011/0050388 A1* | 3/2011 | Lawrence et al. | 340/5.8 |
| 2011/0126135 A1* | 5/2011 | Chambers et al. | 715/763 |
| 2014/0115694 A1* | 4/2014 | Fadell et al. | 726/19 |

FOREIGN PATENT DOCUMENTS

| | | |
|---|---|---|
| KR | 1020080042574 | 5/2008 |
| KR | 10-2008-0079333 | 8/2008 |
| KR | 1020080098803 | 11/2008 |
| WO | 2006/137668 | 12/2006 |

OTHER PUBLICATIONS

Chinese Office Action dated Jul. 9, 2013 for Chinese Patent Application No. 200980152442.5.

Korean Office Action dated Nov. 28, 2014, in Korean Patent Application No. 10-2008-0132497.

* cited by examiner

METHOD AND APPARATUS FOR UNLOCKING ELECTRONIC APPLIANCE

CROSS REFERENCE TO RELATED APPLICATION

This application claims priority from and the benefit of Korean Patent Application No. 10-2008-0132497, filed on Dec. 23, 2008, which is hereby incorporated by reference for all purposes as if fully set forth herein.

BACKGROUND OF THE INVENTION

1. Field of the Invention

Exemplary embodiments of the present invention relate to a control method and apparatus and, more particularly, to an unlocking method for an electronic appliance wherein a user can unlock the electronic appliance through an input gesture and may invoke an application associated with the input gesture.

2. Description of the Background

With rapid advances in technology, manufacturers of mobile devices (e.g., cellular phones) are challenged to continually add greater functional capabilities in smaller form using user interface features to achieve convenience of mobility.

For instance, beyond the already advanced mobile devices and data capabilities, a device need to include other sophisticated functions, for example, a mobile terminal having a touch screen associated with functions of locking and unlocking method as an input means to prevent unintended input result in a standby mode.

The goals of greater functionalities are sometimes at odd with unlocking the mobile terminal in that a user may require extra actions such as entering a password or pressing an independent unlock key.

However, consumers expect more convenient capability in operating functions of the mobile devices, and conventional unlocking scheme may drive a user in trouble situations under circumstances the user forgets the password or needs to unlock the mobile terminal quickly. In addition, it takes a time to return to an initial menu from locking mode, the user may be facing with inconveniency and require to initialize menu options to operate a particular function. Therefore, to be competitive, the manufacturers need to address ever growing requirement for convenient and advanced unlocking function.

SUMMARY OF THE INVENTION

Exemplary embodiments of the present invention provide an unlocking method for unlocking the electronic device in a more convenient and advanced way.

Additional features of the invention will be set forth in the description which follows, and in part will be apparent from the description, or may be learned by practice of the invention.

Exemplary embodiments of the present invention provide an unlocking method and apparatus for an electronic appliance that enable a user to invoke a desired function in response to unlocking the electronic appliance.

Exemplary embodiments of the present invention disclose a method detecting an input gesture applied by an input means. And the input means is locked. The method includes unlocking the input means in response to the input gesture. The method also includes invoking an application mapped to the input gesture.

Exemplary embodiments of the present invention disclose a terminal including a touch sensor associated with input means to receive an input gesture. The input means is locked. The terminal also includes a display section to display an unlocking object. The terminal includes a storage unit to store the unlocking object. The terminal further includes a control unit to determine whether the input gesture is mapped with an application of the unlocking object. And an application mapped to the input gesture is displayed in response to detection of unlocking the input means.

Exemplary embodiments of the present invention disclose an electronic appliance including an input means to receive a user gesture. The electronic appliance includes a processor that is configured to determine whether to unlock the input means, and to invoke an application. The input means is unlocked and the application is invoked according to a mapping process associated with a mapping table by comparing the user gesture with the application of the mapping table.

It is to be understood that both the foregoing general description and the following detailed description are exemplary and explanatory and are intended to provide further explanation of the invention as claimed.

Exemplary embodiments of the present invention further provides an unlocking method and apparatus for a mobile terminal having a touch screen or touch pad that enable the user to conveniently unlock the mobile terminal through an input gesture.

Exemplary embodiments of the present invention further provides an unlocking method and apparatus for a mobile terminal having a touch screen or touch pad that enable the user to directly invoke an application corresponding to an input gesture made to unlock the mobile terminal.

Exemplary embodiments of the present invention further provides an unlocking method and apparatus for an electronic appliance that display mapping information between unlocking gestures and applications, and, when an unlocking gesture is made, unlock the electronic appliance and invoke an application mapped to the unlocking gesture.

Exemplary embodiments of the present invention further provides an unlocking method and apparatus for an electronic appliance having a gesture input means that enable the user to unlock the mobile terminal through an input gesture and to immediately invoke an application mapped to the input gesture.

In accordance with an exemplary embodiment of the present invention, there is provided a method for a mobile terminal, including: detecting an input gesture applied by an input means, the input means being locked; unlocking the input means in response to the input gesture; and invoking an application mapped to the input gesture. In accordance with another exemplary embodiment of the present invention, there is provided a method for an electronic appliance, including: detecting an input gesture through an input means capable of receiving the input gesture; unlocking the input means in response to the input gesture; and invoking an application mapped to the input gesture.

Detecting a gesture input through an input means may include detecting one of: a gesture input signal generated by a motion sensor sensing motion of the user; a gesture input signal generated by a touch pad or touch screen sensing contact and movement of a particular object; a gesture input signal generated by a speech recognition sensor sensing vocal sounds of the user; and a gesture input signal corresponding to a control signal that is generated by a remote controller sensing motion or pointing action of the user, and sent through wired and wireless communication.

In accordance with another exemplary embodiment of the present invention, there is provided a terminal including: a touch sensor associated with input means to receive an input gesture, the input means being locked; a display section to display an unlocking object; a storage unit to store the unlocking object; and a control unit to determine whether the input gesture is mapped with an application of the unlocking object, wherein an application mapped to the input gesture is displayed in response to detection of unlocking the input means.

In accordance with another exemplary embodiment of the present invention, there is provided an electronic appliance including: an input means to receive a user gesture; and a processor is configured to determine whether to unlock the input means, and to invoke an application, wherein the input means is unlocked and the application is invoked according to a mapping process associated with a mapping table by comparing the user gesture with the application of the mapping table.

The input means is capable of gesture input, and may be a motion sensor, a touch pad or touch screen, a speech recognition sensor or the like. The electronic appliance is a device having such a gesture input means, and may be a mobile terminal (a PDA, cellular phone, portable game console, or PMP), a television set, a large format display, a digital signage, or a media kiosk.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Prior to explaining exemplary embodiments of the present invention, for the relevant terminology may be defined for the description below. In the following description, for the purposes of explanation, numerous specific details are set for the in order to provide a through understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

For example, an electronic appliance (e.g., a mobile terminal) may be deployed as a device, a mobile device, cellular handset (or phone), a cordless phone, a mobile transmitter, a stationary wireless transmitter, a wireless personal digital assistant (PDA), a wireless modem, or a pager. In addition, the mobile terminal may be any information and communication appliance or multimedia appliance having a touch screen or touch pad, such as a portable multimedia player (PMP), digital broadcast receiver, personal digital assistant (PDA), portable gaming console, or smart phone.

However, the present invention is not limited only to a certain mobile terminal, and may be applied to any electronic appliance having a gesture input means. For example, devices having a gesture input means may include a mobile terminal, a television set, a large format display (LFD), a digital signage (DS), and a media kiosk. A gesture input means may include a touch pad, a touch screen, a motion sensor, and a speech recognition sensor.

In some examples, an input means is capable of inputting gesture, and may be a motion sensor, a touch pad or touch screen, and a speech recognition sensor. The device having such a gesture input means, for example, can be implemented into a mobile terminal, a television set, a large format display, a digital signage, or a media kiosk.

According to exemplary embodiments of the present invention, the invention may also relate to a method and apparatus for controlling an operation of a mobile terminal having a touch screen or touch pad. For example, the method and apparatus may enable the user to unlock the mobile terminal through an input gesture and to directly invoke an application mapped to the input gesture. The input gesture may correspond to a user action of drawing a figure or a pattern applied on the touch screen or on touch pad.

According to exemplary embodiments of the present invention, an unlocking object may be provided to unlock the mobile terminal according to user settings. The unlocking object may contain information regarding one or more unlocking gestures and applications mapped to the unlocking gestures. Also, the unlocking object may be displayed as screen data on idle screen while the mobile terminal is locked. Hence, the user may readily able to identify an unlocking gesture and an application may be invoked in response to the unlocking gesture that is mapped.

According to exemplary embodiments of the present invention, the unlocking object may not be displayed while the mobile terminal is locked according to user settings. Hence, the unlocking object may be utilized as an unlocking mechanism based on a user gesture and also be utilized as a security mechanism for protecting a privacy of the user. Settings for the unlocking object and displaying thereof may be predefined (e.g., predetermined) or may be arranged by the user.

An example of the unlocking object is shown below in TABLE 1 in which exemplary gestures associated with mapped function are illustrated.

TABLE 1

| Gesture | Mapped function | Description |
| --- | --- | --- |
| V | Dialer | Unlock and invoke dialer |
| 0 | Main menu | Unlock and invoke main menu |
| / | Call log | Unlock and invoke call log |
| < | Phonebook | Unlock and invoke phonebook |
| ⌒ | Message | Unlock and invoke message composition |
| ... | ... | ... |

Table 1 illustrates exemplary unlocking gestures usable by the user. The user may apply one of the listed gestures to unlock the mobile terminal and may invoke an application, function or menu that may be performed by a mapping process by comparing the applied gesture with an application according to a mapping table (e.g., TABLE 1). It is noted that the mapping process performed by comparing an unlocking gesture with an application may not be limited to the TABLE 1. The mapping conditions (e.g., mapping criteria), for example, for mapping an unlocking gesture with the respective mapped application, may be changed according to user settings, for example, an edition, an addition and a deletion of the application, or downloading an application from an external server (e.g., a server of a manufacturer). In addition, the unlocking object may be transmitted to and may be received from a different mobile terminal and may be shared therebetween.

In some examples, the unlocking object may be employed by an electronic appliance such as a television set, and an unlocking gesture may be mapped with a desired broadcast channels for selecting a channel. When the user applies one of the unlocking gestures through an input gesture means, for example, a touch screen arranged to the remote controller or television set, the television set may be unlocked and may be outputting the selected program broadcast channel based on a mapping process by comparing a channel with the input gesture.

For example, for the purpose of illustrations, it is assumed that series of gestures, for example, '1,' '2' and '3' may be mapped with the respective mapped broadcast channel identifiers, for example, 'ch1,' 'ch2' and 'ch3'. The user may watch a broadcast program channel indicated by a channel identifier 'ch1' by applying the gesture '1', and the user may watch the broadcast program channel indicated by the channel identifier 'ch2' by applying the gesture '2,' and the user may watch a broadcast program channel indicated by the channel identifier 'ch3' by applying the gesture '3'. A gesture may be entered during the display unit of the television set is turned off or on, and the television set may recognize an input gesture and the user may receive a broadcast channel associated with the applied gesture regardless of the fact that the display unit is on or off.

In some examples, when the mobile terminal is locked (e.g., locking mode), the terminal may display locking information and may display an unlocking object on idle screen so that the user may intuitively recognize the locking mode. The locking information, for example, may refer to an image, a text, or an icon that can enable the user readily to identify the current locking state of the mobile terminal. The unlocking object may contain information associated with an unlocking gesture and an application mapped to the unlocking gestures. When the user enters one of the unlocking gestures, the mobile terminal may be unlocked and the application mapped to the entered gesture may be invoked and the application may be populated to the user via a display unit. The unlocking gesture and application associated with the unlocking gesture may be set by the user by way of configuration.

In some examples, an unlocking gesture may be mapped to two or more applications. For example, applying an unlocking gesture may trigger simultaneously multiple invocation processes at which two or more applications may be invoked. For example, a gesture of ⌒ illustrated in TABLE 1 may be mapped to a phonebook function and a message function, and applying the gesture of ⌒ may cause the electronic appliance (e.g., mobile terminal) an simultaneous invocation process, consequently may invoke a phonebook function and a message function at the same time. In addition, a priority for the invocation process may be needed to be set between applications if the same unlocking gesture is applied by a user.

For example, for performing a simultaneous execution of the invocation process, the screen data associated with the phonebook function may be displayed together with a message function in a format arrangement, for example, a split screen, an overlapped screen, a vertical screen or a horizontal screen by way of configuration. In addition, the phonebook function and the message function may be simultaneously executed, but the screen data associated with the higher priority function may be displayed first and the screen data associated with lower priority function may be displayed later or may be displayed as a background. The user may switch between the two functions through multitasking.

Priorities between applications mapped to the same gesture may be enumerated by a mapping table, as exemplary illustrated below in TABLE 2.

TABLE 2

| Gesture | Mapped function |
| --- | --- |
| ... | ... |
| ⌒ | 1. Phonebook |
|  | 2. Message |
|  | ... |
| ... | ... |

As illustrate in TABLE 2, the priority between the phonebook function and the message function mapped to the same gesture of ⌒ may be configured by a mapping order.

In some examples, an option indicating whether to display the unlocking object may also be set. Another option indicating whether to display all items or to display a selected item in the unlocking object may also set.

Next, a description is given of a method for controlling the operation of a mobile terminal having a touch screen through user gestures. It is noted that the present invention is not limited to the following description and hence various embodiments are possible.

Figure 1:
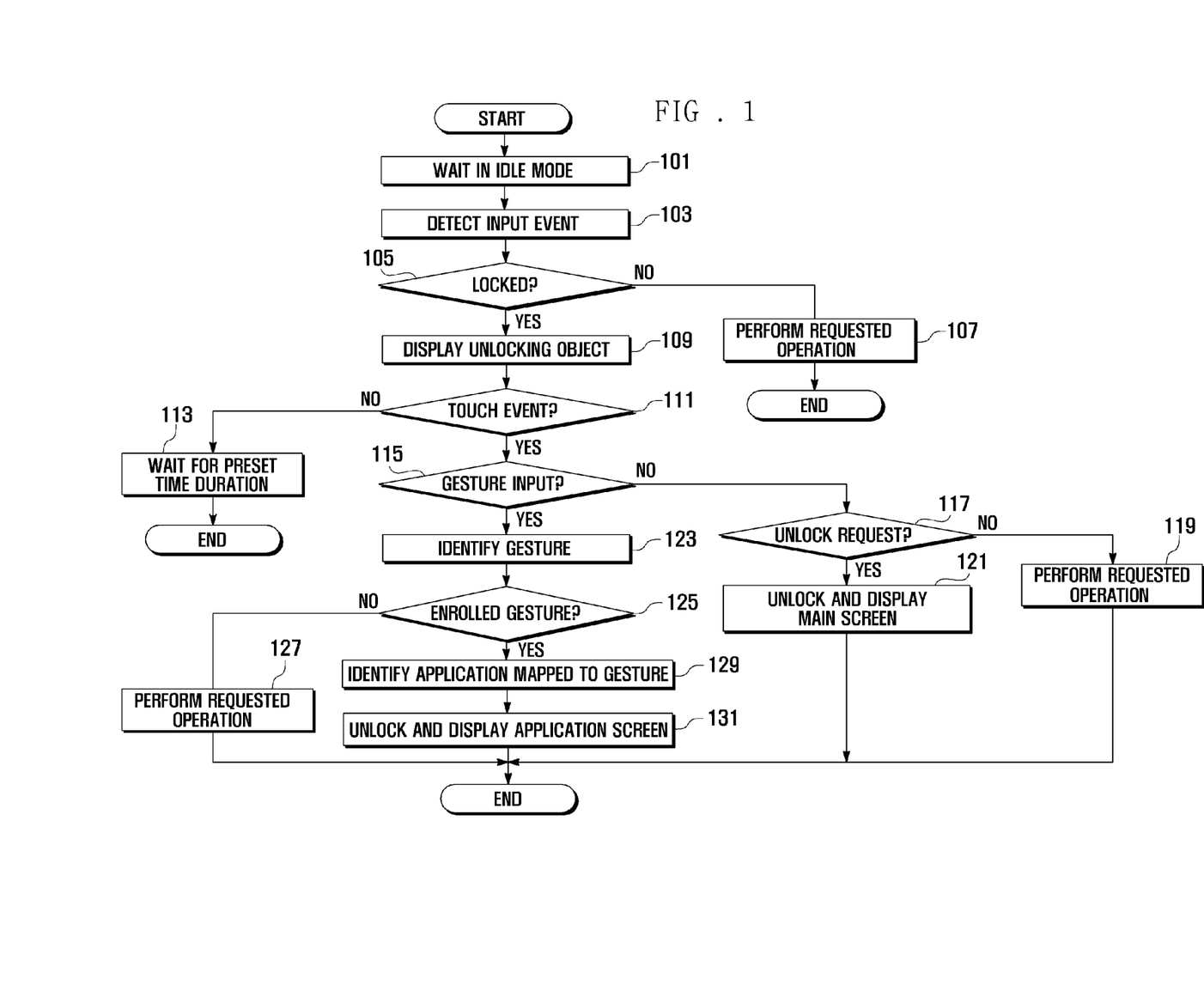
FIG. 1 is a flowchart of a process for an unlocking method for an electronic appliance capable of unlocking the appliance according to an input gesture, according to exemplary embodiments of the present invention.

FIG. 1 is a flow chart of a process for an unlocking method for an electronic appliance (e.g., a mobile terminal) capable of unlocking the terminal using an input gesture associated with an unlocking function module according to exemplary embodiments of the present invention. In FIG. 1, when the mobile terminal in idle mode and being locked, the unlocking object may be displayed on idle screen. However, the unlocking object may be not displayed according to user settings for privacy protection.

Referring to FIG. 1, the mobile terminal may wait in the idle mode (step 101). When the mobile terminal may detect an input event (step 103), the mobile terminal may check whether the input means is locked (step 105). A locking state may then be checked when an input event may be detected. The input means, for example, may be a touch screen, a touch pad, a remote controller, or a key pad. If an input event is detected through the input means, the mobile terminal may turn on the display unit and a display unit may be deployed using a display technology (e.g., liquid crystal display (LCD) technology).

If the input means is not locked, the mobile terminal may perform an operation requested by the input event (107). For example, the mobile terminal may display the idle screen or may display the initial menu.

If the input means is locked, the mobile terminal may display locking information and may display the unlocking object on idle screen to enable the user readily to identify the locking state (step 109). Here, the unlocking object may not be displayed according to user settings. A description of the locking information and the unlocking object may be provided according to TABLE 1 and TABLE 2.

The mobile terminal may check whether a touch event can be an input through the touch screen (step 111). If a touch event is determined as not an input, the mobile terminal may await an input from the user for a preset time (e.g., predetermined time or time threshold) (step 113). If no input is received from the user prior to the preset time expires, the mobile terminal may remain in idle mode with the display unit being turned off.

As in step 115, if a touch event is determined as an input, the mobile terminal may check whether the input touch event corresponds to a gesture of a given pattern (e.g., predetermined gesture). If the input touch event does not correspond to a gesture, the mobile terminal may check whether the input touch event corresponds to an unlocking request (step 117). For example, the input touch event may correspond to the amount of time and/or strength of press input (e.g., a long press input or short press input based on a time threshold for determining pressing duration and/or strength) at a given zone (e.g., predetermined touch zone) for unlocking the mobile terminal.

If the input touch event corresponding to an unlock request (e.g., a long press input for unlocking) is determined, the mobile terminal may unlock the input means and may display an initial screen or display an idle screen) (step 121). If the input touch event does not correspond to an unlocking request, the mobile terminal may perform requested operation according to the mapping process of the applied input touch event (step 119). According to the mapping process, the mobile terminal may display a popup window indicating the locking mode, or may ignore the input touch event.

If the input touch event corresponds to a gesture, in step 115, the mobile terminal may identify the input gesture, per 123, and may check whether the input gesture is specified in the unlocking object (step 125). As such, the input gesture may be compared with an unlocking gesture specified in the unlocking object, as exemplarily illustrated in TABLE 1 or TABLE 2.

If the input gesture is not specified in the unlocking object, the mobile terminal may perform an operation requested by the input gesture (step 127). For example, the mobile terminal may determine the input gesture as an error, and may issue a notice of the locking mode, and may instruct a retry request. The mobile terminal may request the user to decide whether to include a new input gesture as an unlocking gesture in the unlocking object. If the user decides to include the new input gesture as an one of gesture of the unlocking object, the mobile terminal may request the user to assign an application corresponding to the new input gesture. During the assignment process, the mobile terminal may automatically unlock the input means, and may perform a user authentication process according to user settings.

If the input gesture is specified in the unlocking object, the mobile terminal may identify the application mapped to the input gesture (step 129). The mobile terminal may then unlock the input means, may invoke the identified application, and may display a screen for the application (step 131).

Hereinabove, exemplary processes are provided for a control method in which the mobile terminal may be unlocked according to a gesture applied to the touch screen and an application mapped to the gesture may be invoked.

Figure 2:
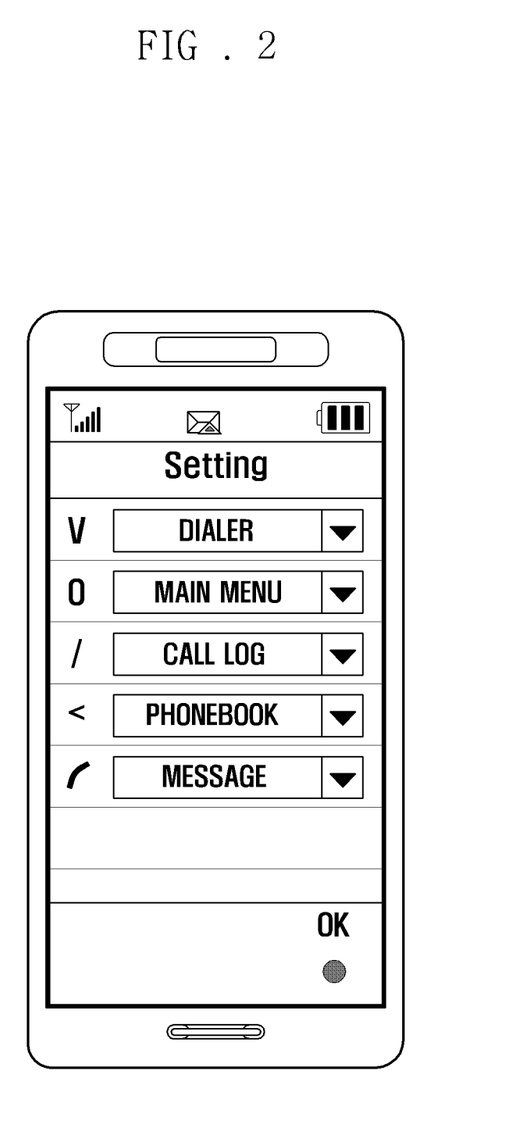
FIG. 2 is an exemplary view illustrating a setting screen for an unlocking object associated with the electronic appliance, according to exemplary embodiments of the present invention.

FIG. 2 is an exemplary view illustrating a setting screen for an unlocking object related to the electronic appliance according to exemplary embodiments of the present invention.

As shown in FIG. 2, a mobile terminal, capable of unlocking operation according to an input gesture, is provided as an example. The mobile terminal may include an input gesture module associated with a mapping table to determine whether an input gesture matches with the respective gesture of an unlocking object. And the determination may be processed using a mapper (e.g., mapping table).

In some examples, the user may setup an option for locking and unlocking of the mobile terminal using a menu. As seen in FIG. 2, for example, five types of gestures may be provided, and the user may select an application to be mapped to one of the five gestures. FIG. 2 may show that each of the gestures V, 0, /, <, and ⌒ can be mapped with respect to a dialer function, a main menu, a call log function, a phonebook function, and a message function.

The user may unlock the mobile terminal by applying (e.g., executing or making) one of the five gestures, and may immediately invoke the application mapped to the applied gesture. For example, if the user makes the gesture < through a touch screen, the mobile terminal 100 may recognize the gesture <, and may unlock the input means, and may invoke the phonebook function and display of a related screen may be followed.

The gestures of the unlocking object may be changed, added, and deleted by way of configuration of the user. If not all the gestures are mapped with applications, a gesture mapped with other function may be displayed on a terminal idle screen. For example, when gestures V and ⌒ are mapped to particular applications, the unlocking object may have information with respect to the gestures V and ⌒ and applications mapped with the gestures may be displayed.

In some examples, the unlocking object 105 may further include an option for indicating whether to hide the unlocking object is necessary to protect a privacy of the user. The user may set gestures and associated applications by controlling the access to the terminal with a restriction as to display of the unlocking object in whole or in part.

When the user sets the option to "display whole," the entire unlocking object may be displayed on terminal idle screen in locking mode. When the user sets the option to "hide," the unlocking object 105 may not be displayed on terminal idle screen in locking mode although the mobile terminal can be unlocked by a specific gesture.

When the user sets the option to "display in part," only selected items of the unlocking object may be displayed on terminal idle screen in locking mode. For example, the mobile terminal may also be unlocked by executing a hidden gesture and an application mapped to the hidden gesture may also be invoked.

Figure 3:
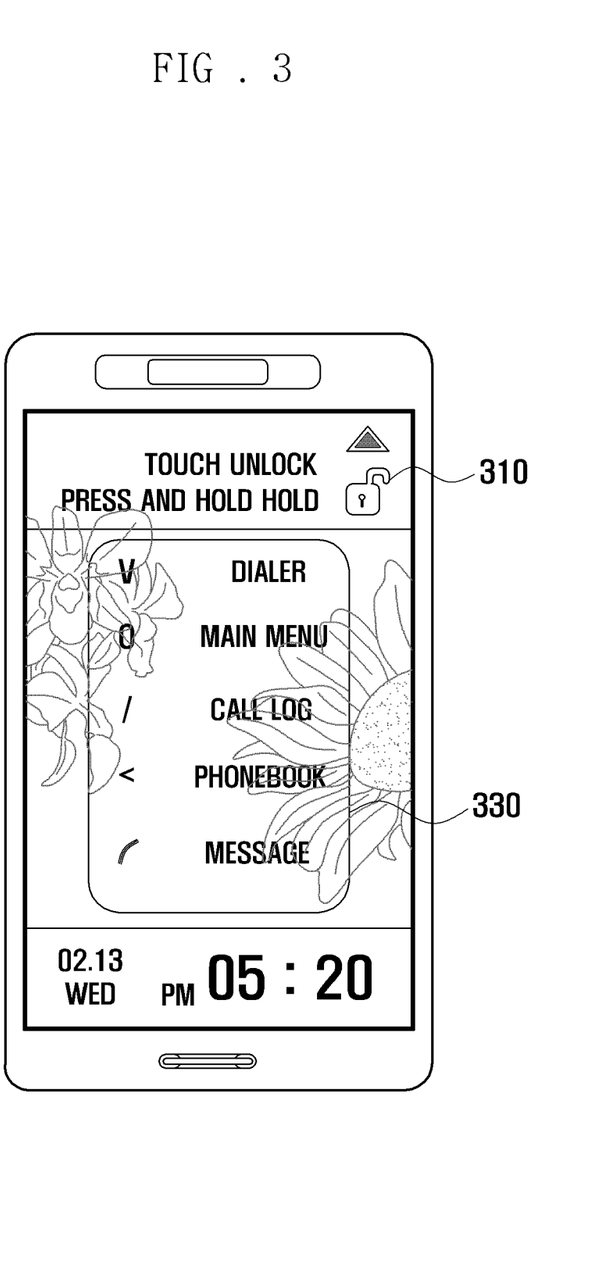
FIG. 3 is an exemplary view illustrating a display of an unlocking object, according to exemplary embodiments of the present invention.

FIG. 3 is an exemplary view illustrating display of the unlocking object when the electronic appliance device is locked according to exemplary embodiments of the present invention.

As shown in FIG. 3 an exemplary unlocking object 330 may be provided with an option of "display whole."

The mobile terminal may remain in idle mode as the display unit is turned off. If the mobile terminal detects an input event, the mobile terminal may turn on the display unit and may display the unlocking object 330. As the unlocking object 330 may include information associated with one or more unlocking gestures and applications mapped to the respective unlocking gestures, the user may readily able to identify a desired unlocking gesture and may invoke an application to be populated or displayed.

As shown in FIG. 3, the mobile terminal 100 may further provide a lock indicator 310 at a zone for unlocking. For example, a lock-shaped icon may be used for the lock indicator 310 to inform the user of the locking state of the mobile terminal.

The user may apply a long press input on the lock indicator 310 to unlock the mobile terminal. A "long press input" may correspond to an input of "press and hold" in which input time for the long press input may require a longer than or equal to a time threshold.

Figure 4:
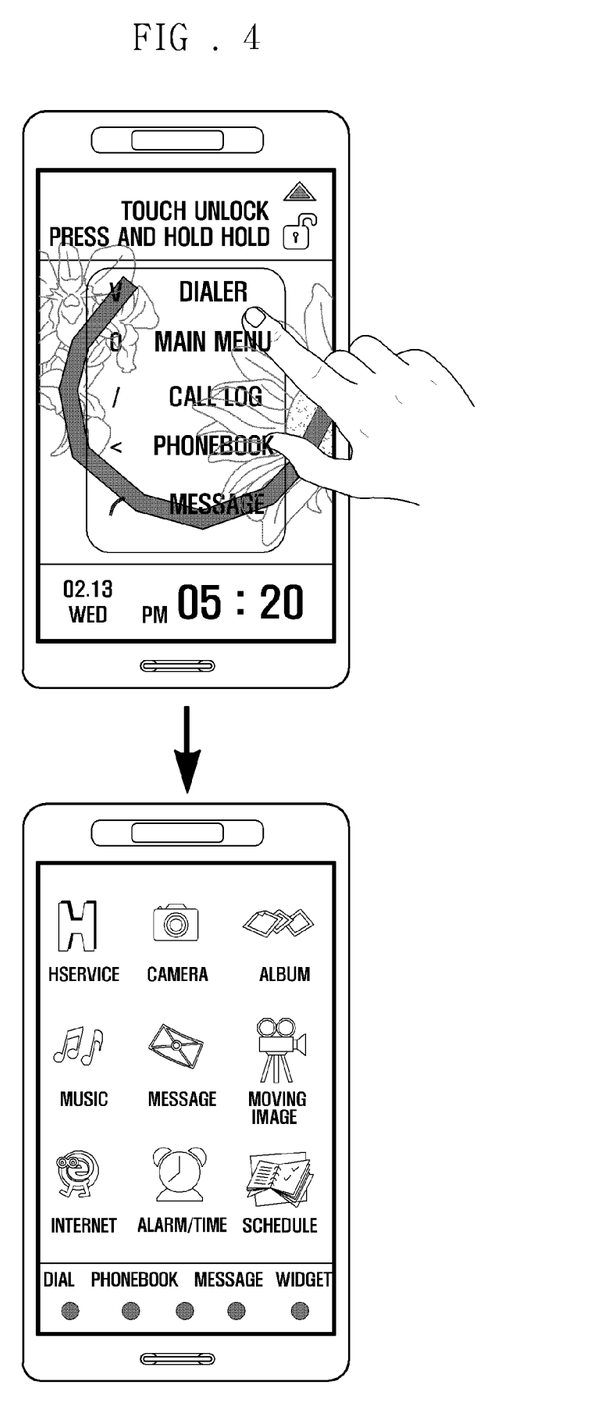
FIG. 4, FIG. 5, and FIG. 6 are exemplary diagrams illustrating various input gestures and responses according to an unlocking method in response to the input gestures, according to exemplary embodiments of the present invention.
Figure 6:
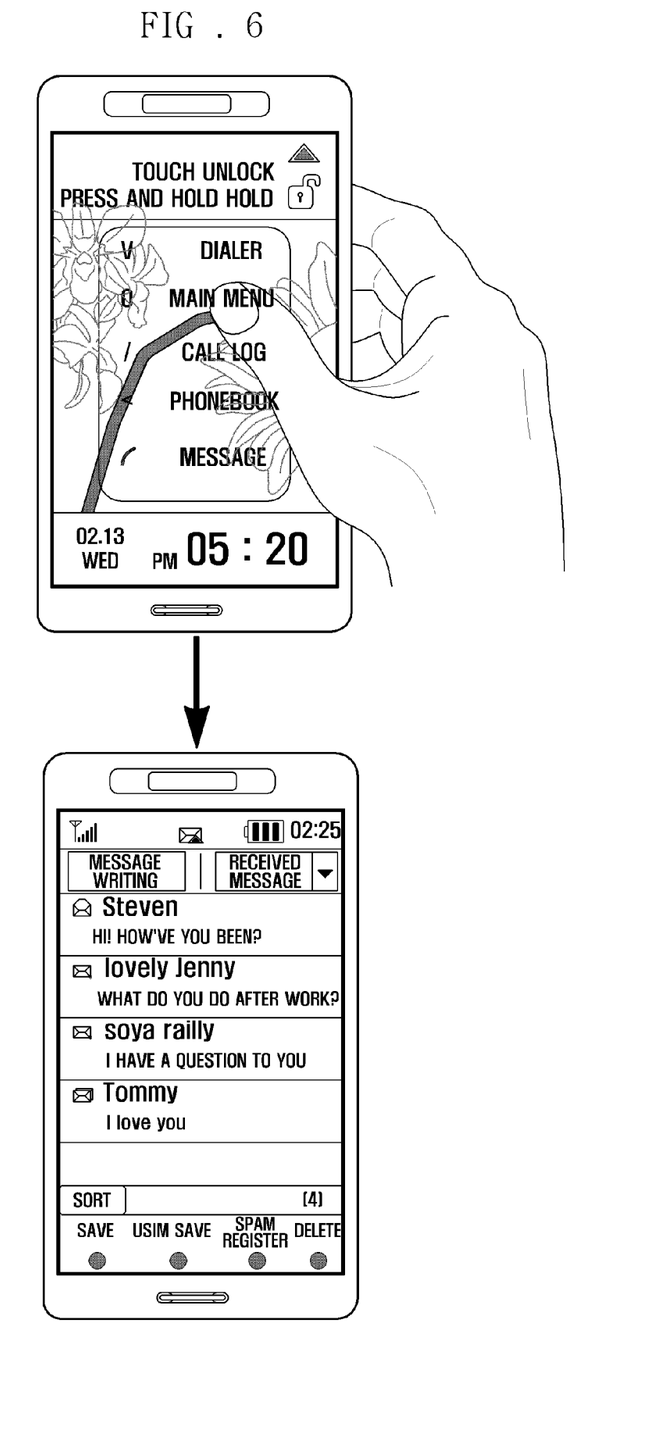

In some examples, FIG. 3, FIG. 4 and FIG. 6 may be related to a mobile terminal having a full touch screen feature. However, the present invention may not be limited to a mobile terminal having a full touch screen feature, and may also be applied to all types of mobile terminals having a touch screen such as folder type, a bar type, and a slide type. The present invention may be applied to a mobile terminal having a touch pad capable of receiving and detecting an applied gesture.

Figure 5:
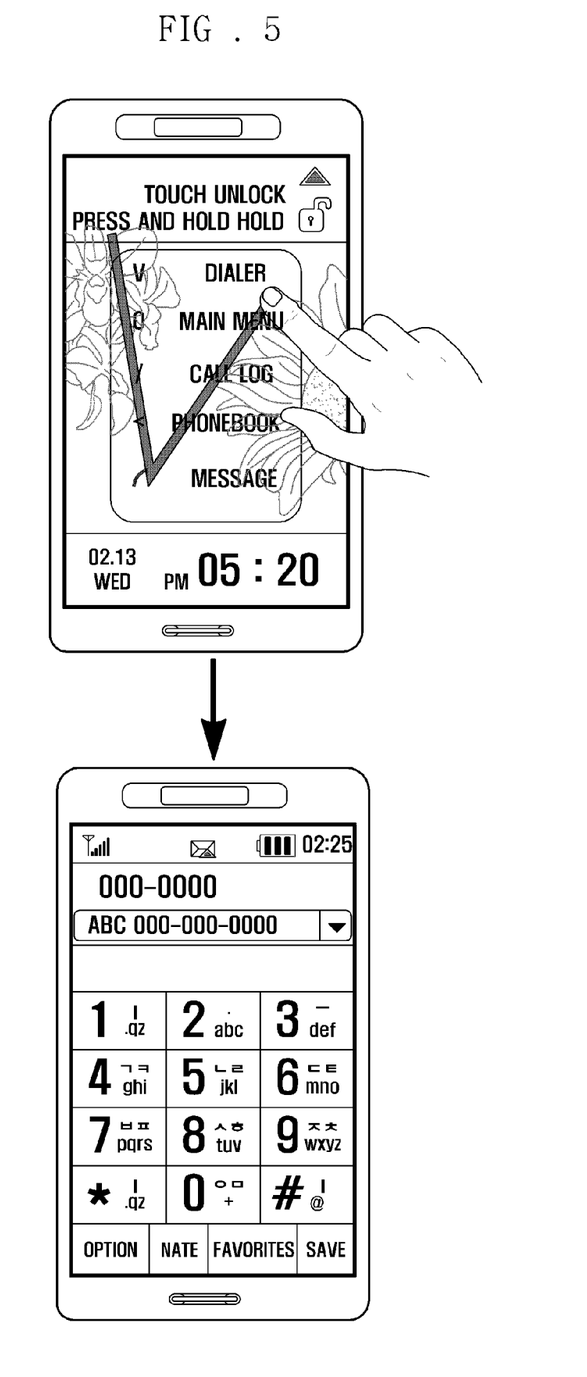

FIG. 4, FIG. 5, and FIG. 6 are exemplary diagrams illustrating various input gestures and responses according to an unlocking method in response to the input gestures according to exemplary embodiments of the present invention.

As shown in FIG. 4, FIG. 5 and FIG. 6, the user may enter a gesture, while the mobile terminal is in the locking status the terminal 100 may display the unlocking object, as shown in FIG. 3.

In FIG. 4, in response to an input with an O-shaped gesture, the mobile terminal may be unlocked and an application mapped to the input O-shaped gesture may be invoked. For example, the application mapped to the O-shaped gesture may be a main menu, and then an item in the main menu may be displayed.

Referring to FIG. 4, if the mobile terminal, being in the locking state, displays the unlocking object in idle screen, the user may apply an O-shaped gesture on the touch screen. In response to detection of the O-shaped gesture, the mobile terminal may recognize the O-shaped gesture as an unlocking gesture having an application of mapping table illustrated as an example in TABLE 1, and may unlock the input means, and may invoke the main menu according to mapping the application with the O-shaped gesture. As a result, items of the main menu may be displayed.

As shown in FIG. 5, in response to a V-shaped gesture input, the mobile terminal may be unlocked and an application mapped to the input V-shaped gesture may be invoked. By way of a configuration, for example, the application mapped to the V-shaped gesture can be a dialer, and the dialer may be invoked.

Referring to FIG. 5, when the mobile terminal, in locking state, displays the unlocking object on the idle screen, the user may make a V-shaped gesture on the touch screen. In response to detection of the V-shaped gesture, the mobile terminal may recognize the V-shaped gesture as an unlocking gesture having an application mapped illustrated as an example in TABLE 1, and may unlock the input means, and may invoke the dialer mapped to the V-shaped gesture. As a result, screen data associated with the dialer may be displayed.

As shown in FIG. 6, in response to input gesture ⌒, the mobile terminal may be unlocked and an application mapped to the input gesture ⌒ may be invoked. If an application mapped to the gesture ⌒ is a message composer, and the message composer can be invoked.

Referring to FIG. 6, when the mobile terminal in locking state displays the unlocking object on the idle screen, the user may apply a gesture ⌒ on the touch screen. In response to the gesture ⌒, the mobile terminal may recognize the gesture ⌒ as an unlocking gesture having an application mapped as illustrated in TABLE 1 as an example, and may unlock the input means, and may invoke the message composer mapped to the gesture ⌒. As a result, screen data related to the message composer may be displayed.

As described above in connection with FIG. 1, FIG. 2, FIG. 3, FIG. 4, FIG. 5, and FIG. 6, the user may apply a gesture (e.g., predetermined gesture) to operate to unlock the mobile terminal and directly to invoke an application or a function mapped to the applied gesture. For example, unlocking of the mobile terminal and invocation of a desired function may be performed by a single gesture. The user may use the mobile terminal in convenient way and may execute a desired function in a rapid manner.

According to exemplary embodiments of the present invention, the mobile terminal may provide the user with a hint for a gesture-making action. As shown in FIG. 3, FIG. 4, FIG. 5 and FIG. 6, the mobile terminal may represent a guideline for visual path to follow a movement of the finger or a stylus to make a gesture on the screen.

Hereinabove, in connection with FIG. 1, FIG. 2, FIG. 3, FIG. 4, FIG. 5 and FIG. 6, a description is provided with respect to a method for controlling a mobile terminal having a touch screen in response to input of a gesture, the mobile terminal may be unlocked and a function associated with corresponding gesture may be executed. Next, a mobile terminal capable of carrying out the above-described method is provided. However, the mobile terminal of the present invention is not limited only to the following description.

For the purpose of description, an electronic appliance (e.g., a mobile communication terminal) may be provided as an example of the mobile terminal of the present invention, however, the present invention is not limited to a mobile communication terminal. The mobile terminal of the present invention may be any types of mobile communication terminals that can operate according to one of communication protocols employed by various communication systems, and may be any information; and the examples of the mobile terminal may be a communication appliance or a multimedia appliance having a touch screen or a touch pad, such as a portable multimedia player (PMP), a digital broadcast receiver, a personal digital assistant (PDA), a portable gaming console, or a smart phone.

Figure 7:
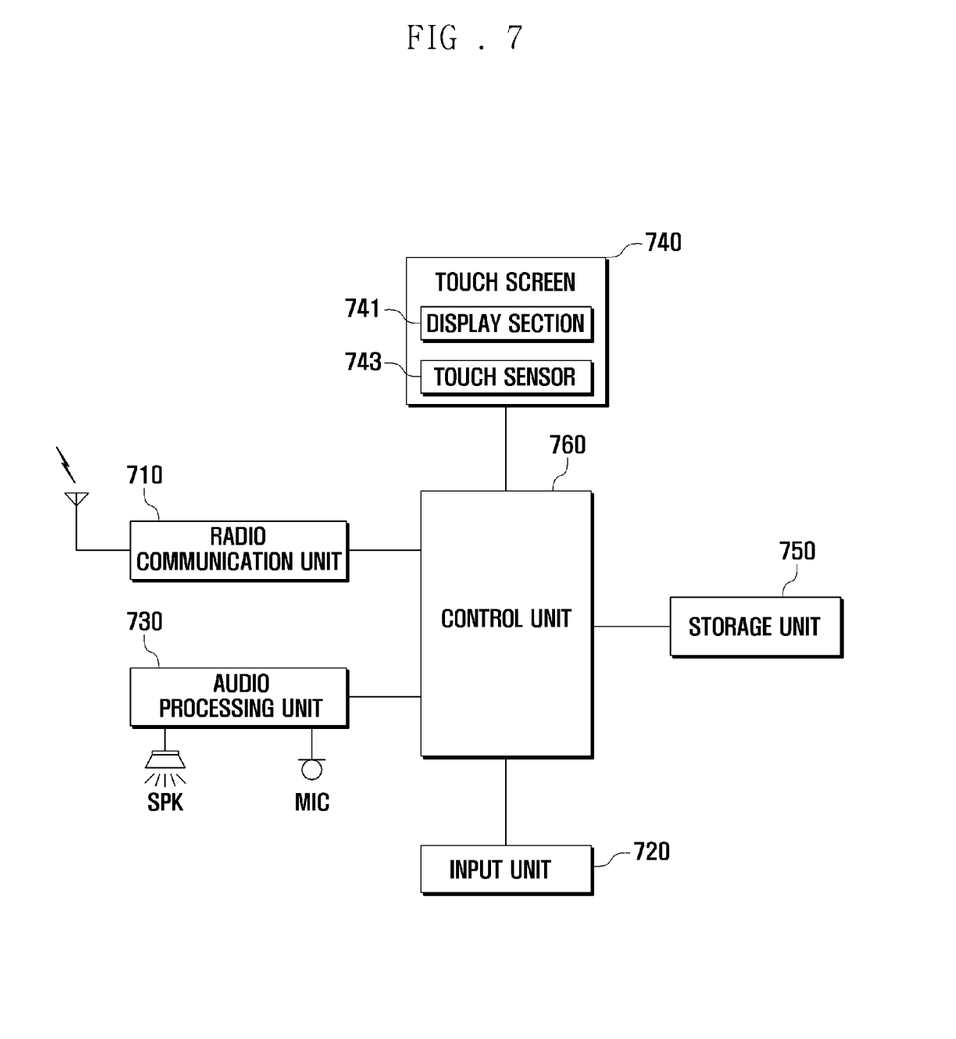
FIG. 7 is a diagram of a hardware that can be used to implement exemplary embodiments of the present invention.

FIG. 7 is a block diagram of a hardware that can be used to implement exemplary embodiments of the present invention. Although illustrated hardware of an electronic appliance (e.g., a mobile communication terminal) is described as an example of the mobile terminal of the present invention, the present invention is not limited to a mobile communication terminal.

FIG. 7 depicts a mobile terminal including a touch screen 740 having a display section 741 and a touch sensor 743 as a single entity. However, the present invention is not limited to such configuration. The mobile terminal may include a display unit (not shown) and a touch pad (not shown) for detecting a gesture input as an independent device. As such, the touch sensor may acting as a gesture input means that may be one of a touch screen 740 at which a touch pad may be configured thereof. If the mobile terminal includes both a touch screen 740 and a touch pad, the touch screen 740 and the touch pad may be served as a gesture input means.

Referring to FIG. 7, the mobile terminal may include a radio communication unit 710, an input unit 720, an audio processing unit 730, a touch screen 740, a storage unit 750, and a control unit 760. The touch screen 740 may include a display section 741 and a touch sensor 743.

The radio communication unit 710 may perform a communication operation for the mobile terminal. The radio communication unit 710 may establish a communication channel to a mobile communication network and may perform communication associated with a voice call, a video telephony call, and data call. The radio communication unit 710 may include a radio frequency (RF) transmitter configured to upconvert a frequency of signal for transmitting and amplifying the signal, and an RF receiver including a filter is configured to gain low-noise amplifying a received signal and to downconvert the frequency of the received signal.

The input unit 720 is configured to receive input alphanumeric information and various input signals to set functions and to control the mobile terminal, and to send the input information and signals to the control unit 760. The input unit 720 may include a keypad and/or a touch pad to generate an input signal corresponding to a user action. In a configuration, the input unit 720 may include a touch pad capable of receiving an input gesture. As such, the touch screen 740 may be replaced with a regular display means. In some configurations, the input unit 720 may be included in the touch screen 740. For example, the touch screen 740 may act as both an input means and a display means, and the input unit 720 may be omitted by way of configuration.

The audio processing unit 730 may be connected to a microphone MIC and a speaker (SPK). The audio processing unit 730 is configured to send an audio signal input through the microphone (MIC) to the control unit 760, and to output an audio signal from the control unit 760 through the speaker (SPK). The audio processing unit 730 is configured to convert an analog audio signal input through the microphone (MIC) into a digital audio signal, and to convert a digital audio signal from the control unit 760 into an analog audio signal. The audio processing unit 730 is configured to reproduce various types of audio signals generated in the mobile terminal (e.g., an audio signal generated by playback of an MP3 file) according to a user selection.

The touch screen 740 may include an input/output means for input and display, and may include the display section 741 and touch sensor 743.

The display section 741 is configured to display screen data generated by the operation of the mobile terminal 100, and to display status information according to user function based on user settings. The display section 741 may display various screen data associated with the functional status of the mobile terminal. The display section 741 may visually present various signals and color information from the control unit 760. In an idle mode, the display section 741 may be turned on and off by the control unit 760. When the mobile terminal is turned on in locking state, the display section 741 may display the unlocking object according to a setting.

The touch sensor 743 may be arranged at the display section 741, and may detect a touch on the touch screen 740. If a touch is detected on the touch screen 740, the touch sensor 743 may identify the coordinated value of the touched point and may send the detected coordinated value to the control unit 760. As such, the touch sensor 743 may detect a touch generated by a user, may create a signal corresponding to the detected touch, and may send the signal to the control unit 760. The control unit 760 may perform a function associated with the touch point.

In some examples, the touch screen 740 may sense a gesture input by the user. If an input gesture is detected by the touch sensor 743, while the unlocking object being displayed on the display section 741, the touch screen 740 may send the input gesture to the control unit 760. In response to the input gesture, the control unit 760 may unlock the mobile terminal, may invoke an application associated with the input gesture, and may output screen data for the invoked application to the display section 741.

The storage unit 750 may include a read only memory (ROM) and a random access memory (RAM). The storage unit 750 may store various data that is generated and utilized by the mobile terminal. For example, the various data may include data generated by executing an application, data generated by operating the mobile terminal, or data received from an external entity, for example, a base station, another mobile terminal, or a personal computer. Various data may include setting information as to the user interface, user settings for invoking an application, user settings for unlocking a mobile terminal. The storage unit 750 may store information as to mapping may be processed by the control unit 760 by comparing an unlocking gesture with an application, which may correspond to the unlocking object.

The storage unit 750 may store an application for controlling the operation of the mobile terminal, and an application associated with the unlocking method of the present invention. Various types of applications may be stored in an application storage area (not shown) of the storage unit 750. In addition, the storage unit 750 may include one or more buffers to temporarily store data generated by executing an application.

The control unit 760 including a processor (not shown) may control the operation of the mobile terminal, and may control signal communicated between internal blocks of the mobile terminal. In some examples, the control unit 760 may control signal communicated from and to each of the internal blocks including the radio communication unit 710, the input unit 720, the audio processing unit 730, the touch screen 740, and the storage unit 750.

In response to reception of an input gesture from the touch screen 740 in locking state, the control unit 760 may unlock the mobile terminal and may cause to invoke an application associated with the input gesture.

When an event is detected in the locking state, the control unit 760 may display the unlocking object on the display section 741 according to user settings. The control unit 760 may determine whether the mobile terminal can be unlocked in response to a gesture input through the touch screen 740. If a gesture is an input applied through the touch screen 740, the control unit 760 may identify the input gesture, may check whether the input gesture is a gesture specified in the unlocking object, may unlock the mobile terminal if the input gesture is a specified gesture (e.g., predetermined gesture), may identify (e.g., determine) the application mapped to the specified gesture, may invoke the identified application, and may cause to display of screen data associated with the invoked application.

The control unit 760 may control the operation associated with the unlocking method of the present invention described as an example in connection with FIG. 1, FIG. 2, FIG. 3, FIG. 4, FIG. 5 and FIG. 6. This control function may be implemented using software.

According to various exemplary embodiments of the invention, execution of the instructions contained in the storage unit 750 may cause the processor to perform processes according to the instructions. The control unit 760 may include one or more processors in a multi-processing arrangement to execute the instructions contained in storage unit 750. Hard-wired circuitry may be used in place of, or in combination with, software instructions to implement one or more of the exemplary embodiments of the present invention. For example, reconfigurable hardware, such as Field Programmable Gate Arrays (FPGAs), can be used, and functionality and connection topology of the FPGA logic gates may be customized at run-time, typically by programming memory look up tables. Thus, exemplary embodiments of the present invention are not limited to any specific combination of hardware circuitry and/or software.

A "computer-readable medium" may refer to any medium that provides instructions to the processor for execution. Such a medium may be implemented in various forms, including but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including the wires that comprise the bus. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other suitable magnetic medium, a compact disk read-only memory (CD-ROM), compact disc rewritable (CDRW), digital video disc (DVD), any other suitable optical medium, punch cards, optical mark sheets, any other suitable physical medium with patterns of holes or other optically recognizable indicia, a random-access memory (RAM), a programmable read-only memory (PROM), and erasable programmable read-only memory (EPROM), a FLASH-EPROM, any other memory chip or cartridge, and a carrier wave.

Various forms of computer-readable media may be involved in providing instructions to a processor for execution. For example, the instructions for carrying out at least part of the present invention may be implemented on a magnetic disk of a remote computer. The remote mobile terminal may load the instructions into the storage unit 750 and may send the instructions, for example, over a telephone line using a modem. A modem of a local system may receive the data on a telephone line and/or may be used an infrared transmitter to convert the data to an infrared signal and may transmit the infrared signal to the electronic appliance (e.g., mobile terminal). The electronic device may receive information and instructions provided by the infrared signal. The bus may provide the information and instructions to the storage unit 750, from which a processor may retrieve and execute the instructions. The instructions received by storage unit 750 may optionally be stored either before or after execution by the control unit 760.

The control unit 760 may include a baseband module (not shown) to receive a mobile communication service. The baseband module may also be included in the radio communication unit 710, or may be provided as a separate entity as an independent component of the control unit 760 or the radio communication unit 710.

The mobile terminal of FIG. 7 may include various types of components for implementing the present invention. Although not shown in FIG. 7, the mobile terminal of the present invention may further include a digital broadcast receiver module configured to receive a digital broadcast, a short-range communication module configured to receive short-range communication, and an Internet communication module configured to communicate with an Internet network. The mobile terminal may further include various types of units (e.g., components) or modules for enabling digital convergence. As for a mobile terminal, one block may be omitted or replaced with another block according to a configuration. Those of ordinary skill in the art may recognize a configuration.

The present invention may be applied to a mobile terminal, but is not limited to a mobile terminal. The present invention may also be applied to various types of electronic appliances having a gesture input means. The gesture input means may be a motion sensor that may generate a motion sensing signal corresponding to movement of the user, a touch pad or touch screen that may generate a touch sensing signal corresponding to contact and movement of an object (for example, a finger or stylus), a speech recognition sensor may generate a speech sensing signal corresponding to speech activation by the user. The electronic appliance may be a device having such a gesture input means, and may be various types of mobile terminals, for example, a personal digital assistance (PDA), cellular phone, portable game console, or portable multimedia player (PMP), a television set, a large format display, a digital signage, and a media kiosk. The display part of the electronic appliance may be configured by utilizing various types of display technologies based on, for example, a liquid crystal display (LCD), a plasma display panel (PDP), and an organic light emitting diodes (OLED). The gesture input means may be configured by utilizing a remote controller for an electronic appliance. The remote controller may include a keypad for sensing an activity on a button, or may include a gyro sensor, an acceleration sensor, an infrared light emitting diode (LED) and an image sensor for sensing a movement or a pointing action. The remote controller may generate a control signal corresponding to a sensing result, and may send the control signal via wired or wireless communication network to the electronic appliance, which then may operate according to a user gesture.

The electronic appliance of the present invention may have an exemplary configuration of a mobile terminal. For example, the electronic appliance may include an input means configured to receive a user input and user gesture, a control means configured to determine whether to unlock the electronic appliance according to an input gesture, or to cause to invoke an application mapped to the input gesture in response to detection of unlocking. The electronic appliance may further include a display means configured to display an unlocking object in response to determination of a mapping performed by comparing an unlocking gesture with an application, and a storage means is configured to store the unlocking object. Various types of components of the electronic appliance may correspond operate a mobile terminal.

The unlocking method for an electronic appliance having an input means may include sensing an input gesture through the input means, unlocking the electronic appliance according to the input gesture, and invoking an application mapped to the input gesture in response to detection of unlocking. Sensing an input gesture may include detecting a sensing signal generated by a motion sensor for detecting a movement of the user, a sensing signal generated by a touch pad or touch screen sensing contacted and applied movement by a particular object, a sensing signal generated by a speech recognition sensor for detecting speech control by the user, and a control signal generated and transmitted by a remote controller sensing motion or pointing action by the user. An operation method for unlocking the electronic appliance may correspond to an operation method for unlocking of the mobile terminal.

According to exemplary embodiments of the present invention, the invention may provide an unlocking method and apparatus for an electronic appliance that enable the user to unlock the electronic appliance in a convenient way. When the electronic appliance is unlocked, the user can invoke a desired function and/or a frequently used function, thus enhancing usability of the electronic appliance.

According to exemplary embodiments of the present invention, the unlocking method and apparatus for a mobile terminal enable the user to unlock the mobile terminal appliance in a convenient way by applying a gesture through a touch screen or touch pad and to invoke a function mapped to the applied gesture. Hence, usability of the mobile terminal can be enhanced.

According to exemplary embodiments of the present invention if a mobile terminal is locked, information regarding to a mapping process may be performed between unlocking gestures and an application may be provided on idle screen, the information enables the user to appreciate accommodated function of the unlocking gestures associated with respective application in an intuitive way through the mapping process. The information with respect to mapping process performed between an unlocking gesture and an application may not be displayed on an idle screen according to user settings for protecting a privacy of the user.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method, comprising:
 displaying an idle screen comprising an unlocking object associated with unlocking an input means that is locked, the unlocking object comprising depictions of input gesture patterns mapped to applications, the input gesture patterns being in different shapes than one another;
 detecting an input gesture pattern applied in association with the input means;
 determining that the input gesture pattern corresponds to one of the input gesture patterns each associated with unlocking the input means;
 identifying at least one of the applications mapped to the input gesture pattern;
 unlocking the input means in response to detecting the input gesture pattern; and
 invoking the at least one application mapped to the input gesture pattern.

2. The method of claim 1, wherein each of the input gesture patterns is mapped to at least one different application than the other ones of the input gesture patterns.

3. The method of claim 1, wherein determining that the input gesture pattern corresponds to one of the input gesture patterns comprises:
 comparing the input gesture pattern with at least one pre-defined pattern stored as a mapped input gesture pattern.

4. The method of claim 1, further comprising:
 activating, in response to detecting another input gesture, a display section comprising the idle screen, the another input gesture being detected before the input gesture pattern; and
 displaying the unlocking object based on activating the display section.

5. The method of claim 1, wherein the input gesture pattern is mapped to a plurality of the applications, the method further comprising:
 invoking the plurality of the applications mapped to the input gesture pattern.

6. The method of claim 1, wherein displaying the idle screen comprising the unlocking object comprises:
 displaying descriptive information in association with each of the depicted input gesture patterns.

7. The method of claim 6, wherein the descriptive information associated with each of the input gesture patterns comprises an indication of one or more applications mapped to the corresponding input gesture patterns.

8. The method of claim 1, wherein the depictions comprise path information associated with the input gesture patterns.

9. The method of claim 1, wherein the unlocking object is displayed, via the idle screen, in whole or in part according to one or more user settings.

10. The method of claim 1, wherein the input means comprises a touch screen or a touch pad.

11. A terminal, comprising:
 a touch sensor associated with input means to receive an input gesture pattern, the input means being configured to toggle between a locked state and an unlocked state;
 a display section to display an unlocking object in association with the locked state, the unlocking object comprising depictions of input gesture patterns mapped to applications, the input gesture patterns being in different shapes than one another;
 a storage unit to store the unlocking object; and
 a control unit to:
  determine that the input gesture pattern corresponds to one of the input gesture patterns each associated with unlocking the input means; and
  identify at least one of the applications mapped to the input gesture pattern,
 wherein the at least one application mapped to the input gesture pattern is displayed in response to the input means being unlocked.

12. The terminal of claim 11, wherein the control unit is further configured to:
 identify the input gesture pattern via the touch sensor;
 determine that the input gesture pattern corresponds to a mapped input gesture pattern; and
 control unlocking of the input means to invoke the at least one application based on the determination that the input gesture pattern corresponds to one of the input gesture patterns and the identification of the at least one application mapped to the input gesture pattern.

13. The terminal of claim 11, wherein the control unit is further configured to determine, in response to detection of a user input, whether the input means is in the locked state, whether the user input corresponds to one of the input gesture patterns, and whether the one input gesture pattern corresponds to at least one pre-defined input gesture pattern stored as a mapped gesture.

14. The terminal of claim 11, wherein the control unit is further configured to:
 activate the display section; and
 control the display section to display the unlocking object.

15. The terminal of claim 13, wherein each of the input gesture patterns is mapped to at least one different application than the other ones of the input gesture patterns.

16. The terminal of claim 11, wherein the control unit is further configured to control the display section to display information associated with the locked state of the input means and descriptive information in association with each of the depicted input gesture patterns.

17. The terminal of claim 11, wherein the unlocking object comprises descriptive information in association with each of the depicted input gesture patterns associated with unlocking the input means, the descriptive information comprising an indication of one or more applications mapped to the corresponding input gesture patterns.

18. The terminal of claim 11, wherein the depictions comprise path information associated with the input gesture patterns.

19. The terminal of claim 11, wherein the control unit is further configured to control an operation of the unlocking object being displayed in whole or in part according to one or more user settings.

20. The terminal of claim 11, wherein the touch sensor comprises an input means formed to the display section, and an individual input means independent from the display section.

21. An electronic appliance comprising:
an input means to receive a user gesture corresponding to an input pattern;
a display means configured to display an unlocking object associated with unlocking the input means, the unlocking object comprising depictions of gestures mapped to applications, the gestures being in different shapes than one another; and
a processor configured to:
determine whether to unlock the input means based on the input pattern; and
invoke at least one of the applications,
wherein the processor is further configured to, based on a comparison of the input pattern with at least one of a plurality of pre-defined input patterns corresponding to the gestures associated with unlocking the input means and stored in association with a mapping table, unlock the input means and invoke the at least one application associated with a pre-defined pattern corresponding to a gesture according to a mapping process associated with the pre-defined pattern corresponding to the gesture of the mapping table if the input pattern corresponds to the pre-defined pattern corresponding to the gesture.

22. The electronic appliance of claim 21, wherein:
the display means is further configured to display information associated with the plurality of pre-defined input patterns corresponding to the plurality of gestures associated with transitioning the input means between the locked state and the unlocked state; and
the electronic appliance further comprises a storage means configured to store the unlocking object.

23. The electronic appliance of claim 21, wherein the input means comprises:
a motion sensor configured to generate an input gesture corresponding to an input pattern according to a sensed motion by a user;
a touch pad or touch screen configured to generate an input gesture corresponding to an input pattern associated with a sensed contact and movement of an object;
a speech recognition sensor configured to generate an input signal associated with a sensed vocal sound of the user; and
a remote controller configured to:
generate at least one control signal according to the sensed motion, sensed contact and movement of the object, or sensed vocal sound of the user, and
transmit the control signal to the electronic appliance via at least one telecommunications network comprising at least one of a wired communication network and a wireless communication network,
wherein the control signal is at least associated with transitioning the input means between the locked state and the unlocked state.

24. An unlocking method for an electronic appliance, comprising:
displaying an idle screen comprising an unlocking object associated with unlocking a locked input means associated with the electronic appliance, the unlocking object comprising depictions of input gesture patterns mapped to applications, the input gesture patterns being in different shapes than one another;
detecting an input gesture pattern via the input means, the input means being configured to receive the input gesture pattern;
determining that the input gesture pattern corresponds to one of the input gesture patterns each associated with unlocking the input means;
identifying at least one of the applications mapped to the input gesture pattern;
unlocking the input means in response to detecting the input gesture pattern; and
invoking the at least one application mapped to the input gesture pattern.

25. The unlocking method of claim 24, further comprising:
storing the unlocking object;
activating, in response to detecting another input gesture detected while the input means is locked, a display means;
displaying the unlocking object in response to activating the display means; and
displaying descriptive information mapped to the input gesture patterns via the unlocking object and the display means.

26. The unlocking method of claim 24, wherein detecting the input gesture via the input means comprises:
detecting at least one of:
a first gesture input signal corresponding to an input gesture pattern generated by a motion sensor configured to detect motion of a user,
a second gesture input signal corresponding to an input gesture pattern generated by a touch pad or touch screen configured to detect a contact and a movement of an object, and
a third gesture input signal generated by a speech recognition sensor configured to detect a vocal sound of the user; and
receiving an input gesture signal corresponding to at least one control signal that is generated by a remote controller configured to:
generate the at least one control signal based on at least one of the first, second, and third gesture input signals, and
transmit the at least one control signal via at least one telecommunications network comprising at least one of a wired communication network and a wireless communication network.

27. An apparatus, comprising:
a touch screen comprising a display part and a touch sensor, the display part being configured to display different gesture input path shapes in response to detection of a first input gesture on the touch sensor with the apparatus in a locked state; and a control unit configured to:
- detect a second input gesture on the touch sensor with the apparatus in the locked state, the second input gesture forming an input path;
- determine whether the input path of the second input gesture matches one of the different gesture input path shapes displayed via the display part; and
- in response to a determination that the input path matches one of the different gesture input path shapes, unlock the apparatus and execute an application mapped to the one of the different gesture input path shapes.

* * * * *